United States Patent [19]

Yamamoto

[11] Patent Number: 4,898,033
[45] Date of Patent: Feb. 6, 1990

[54] ACCELERATION SENSOR

[75] Inventor: Toshimasa Yamamoto, Aichi, Japan

[73] Assignee: Kabushiki Kaisha Tokai-Rika-Denki-Seisakusho, Aichi, Japan

[21] Appl. No.: 236,737

[22] Filed: Aug. 26, 1988

[30] Foreign Application Priority Data

Sep. 24, 1987 [JP] Japan .............. 62-145700[U]

[51] Int. Cl.$^4$ ............................................. G01P 15/02
[52] U.S. Cl. ................................. 73/514; 242/107.4 A
[58] Field of Search ................. 73/514; 242/107.4 A; 280/806; 297/478; 200/61.45 R; 116/203

[56] References Cited

U.S. PATENT DOCUMENTS

| | | | |
|---|---|---|---|
| 3,722,824 | 3/1973 | Hayashi | 242/107.4 A |
| 3,967,510 | 7/1976 | Lindblad | 242/107.4 A |
| 4,148,447 | 4/1979 | Lindblad | 242/107.4 A |
| 4,467,981 | 8/1984 | Mori et al. | 242/107.4 A |
| 4,522,350 | 6/1985 | Ernst | 242/107.4 A |
| 4,607,805 | 8/1986 | Burghardt et al. | 242/107.4 A |

FOREIGN PATENT DOCUMENTS

| | | |
|---|---|---|
| 57-53574 | 11/1982 | Japan . |
| 60-1426 | 1/1985 | Japan . |
| 61-56468 | 12/1986 | Japan . |
| 62-5298 | 2/1987 | Japan . |
| 62-25868 | 2/1987 | Japan . |

Primary Examiner—Michael J. Tokar
Assistant Examiner—Robert P. Bell
Attorney, Agent, or Firm—Sixbey, Friedman, Leedom & Ferguson

[57] ABSTRACT

An acceleration sensor has a lever which is swung by the movement of a mass body that is held in a holding member in such a manner as to be movable relative thereto when an acceleration of a predetermined magnitude or greater acts on the holding member in the horizontal direction. The sensor also has a transmission member which is swung by the movement of the mass body and of which the swinging causes the lever to swing, and a prevention member which prevents any upward movement of the transmission member. Therefore, even when the mass body is affected by an acceleration acting in the vertical direction, any affection of the acceleration is prevented from being transmitted to the lever via the transmission member.

20 Claims, 3 Drawing Sheets

ACCELERATION SENSOR

BACKGROUND OF THE INVENTION

1. Field of the Invention

The present invention relates to an acceleration sensor which may suitably be used in a webbing retractor installed in a vehicle and adapted to detect an emergency experienced by the vehicle from the acceleration acting in the horizontal direction, and suspend the reeling out of the webbing upon detection.

2. Description of the Related Art

A webbing retractor of the above-described type has an acceleration sensor provided for sensing the acceleration of the vehicle that acts in the horizontal direction. The acceleration sensor has a mass body which is movable on an inclined surface, and an arrangement of the sensor is known in which, when the mass body moves in the horizontal direction to climb the inclined surface, a lever-shaped pawl is actuated by the action of the mass body to suspend the rotation of a lock ring, thereby instantly suspending the reeling out of the webbing from the webbing retractor.

With this arrangement of the acceleration sensor, however, the pawl is also actuated when the mass body moves vertically. With the above-described acceleration sensor, therefore, when an acceleration acts in the vertical direction, the reeling out of the webbing is suspended even though the vehicle is not experiencing any emergency.

Such a phenomenon often takes place when the vehicle is running on a road having a rough surface or if the vehicle is a vehicle such as a motor-truck having a large suspension spring constant. More specifically, the phenomenon occurs when, due to a factor such as vibration of the vehicle, the mass body jumps upward from the inclined surface or undergoes rolling movement on the inclined surface. In such a case, the vertical acceleration is much greater than a horizontal acceleration of an ordinary magnitude.

SUMMARY OF THE INVENTION

An object of the present invention is to provide an acceleration sensor which is capable of preventing any unnecessary actuation of a lever when an acceleration of a large magnitude acts in the vertical direction.

According to the present invention, there is provided an acceleration sensor comprising: a mass body which is held in a holding member and is movable relative to the holding member when an acceleration of a predetermined magnitude or greater acts on the holding member in a substantially horizontal direction; a transmission member which is tiltingly disposed upon the mass body in such a manner that the upward movement of the transmission member is limited and which is tilt when pushed by the movement of the mass body; and a lever which is disposed upon the transmission member and which is swung when the tilting movement of the transmission member is transmitted thereto.

With the above-stated arrangement of the acceleration sensor in accordance with the present invention, when an acceleration of a predetermined magnitude or greater acts on the holding member in the horizontal direction, the mass body is moved relative thereto, the transmission member is pushed by the mass body to tilt, and the tilting movement of the transmission member is transmitted to the lever, thereby causing swinging of the lever. Since the upward movement of the transmission member is limited, the transmission member does not push and swing the lever even when the transmission member is pushed by the mass body which is subjected to a force acting to move the mass body upward due to an acceleration acting in the vertical direction.

DESCRIPTION OF THE PREFERRED EMBODIMENT

Figure 1:
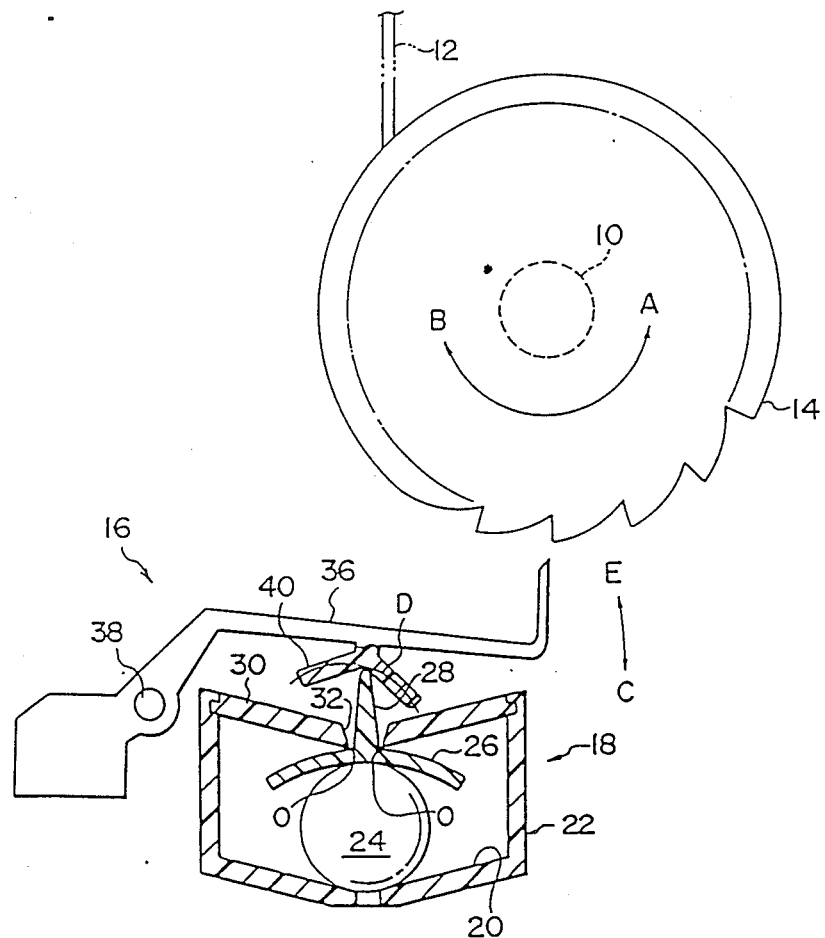
FIG. 1 is a sectional side view of an acceleration sensor in accordance with one embodiment of the present invention, in which the sensor is used in a webbing retractor of a vehicle.
Figure 2:
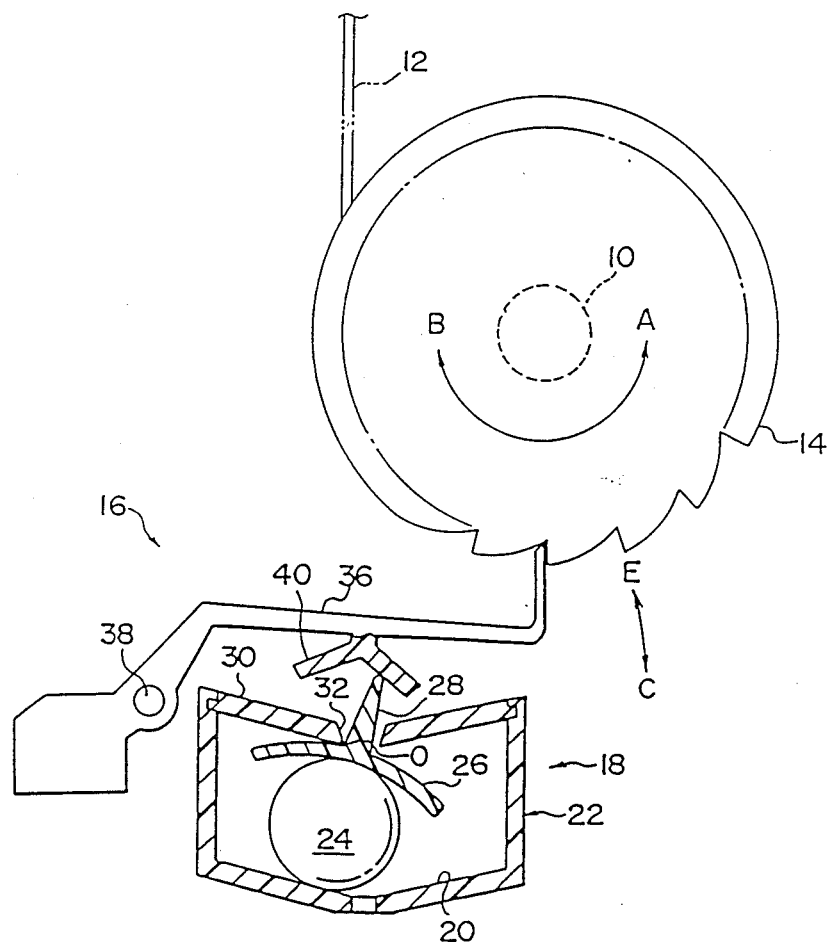
FIG. 2 is a sectional side view of the acceleration sensor, which shows the sensor in operation.
Figure 3:
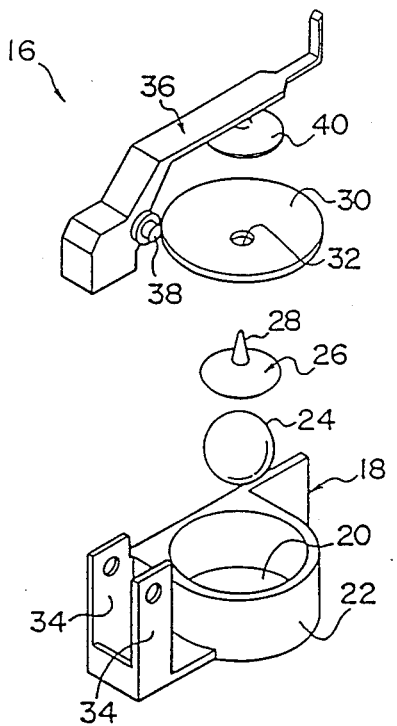
FIG. 3 is an exploded perspective view of the acceleration sensor.

FIGS. 1 to 3 illustrate an embodiment of the present invention in which an acceleration sensor of the present invention is used in a webbing retractor of a vehicle.

The webbing retractor has a retractor shaft 10 the axis of which extends in the horizontal direction. A webbing 12, which may be fastened around an occupant of the vehicle, is retracted onto the retractor shaft 10 by the force of a flat spiral spring (not shown) in the direction A shown in FIG. 1. A lock ring 14 is disposed coaxially with the retractor shaft 10 and is linked to the shaft 10 via a locking mechanism (not shown). The lock ring 14 has ratchet teeth formed in the outer periphery thereof. When the rotation of the lock ring 14 in the direction B shown in FIG. 1 is prevented, the rotation of the retractor shaft 10 in the direction B is also prevented by virtue of the locking mechanism. With this state of the retractor, the webbing 12 is prevented from being reeled out from the retractor. The retractor is provided with an acceleration sensor 16 in accordance with the present invention.

The acceleration sensor 16 has a bolding member 18 mounted on a frame (not shown) of the retractor at a position below the lock ring 14. The bodling member 18 opens at the upper portion thereof and has a cylindrical portion 22. The upper surface of the bottom wall of the cylindrical portion 22 forms a guide surface 20. The guide surface 20 has a flat surface portion formed at the center thereof, and, as a whole, the guide surface 20 is a conical surface which protrudes downwardly with its central portion positioned lowest. A steel ball 24, serving as a mass body, is placed on the guide surface 20.

A pendulum 26, serving as a transmission member, is placed upon the ball 24. The pendulum 26 is umbrella-shaped and has its lower surface formed as an upwardly convex spherical surface. The pendulum 26 has an elongated and tapered projection 28 which is formed at the center thereof and which projects upward.

A cap 30 is secured to the cylindrical portion 22 of the holding member 18 in such a manner as to cover an opening at the upper portion of the holding member 18. The lower surface of the cap 30 is formed as a downwardly protruding conical surface, and the central portion of the cap 30 is formed with a through hole 32. The projection 28 of the pendulum 26 is passed through the through hole 32.

When neither a vertical acceleration nor a horizontal acceleration of at least a predetermined magnitude is acting, the ball 24 is situated at the center of the guide surface 20, as shown in FIG. 1. At this time, the pendulum 26 is at its upright position. When an acceleration acts in the vertical direction from the above-described condition, and, accordingly, the ball 24 is subjected to a force acting to move it upward, the pendulum 26 is pushed by the ball 24. However, the pushed pendulum 26 presses against the cap 30 and is thus kept from moving upward. At this time, the pendulum 26 maintains its upright position.

When an acceleration of a predetermined magnitude or greater acts in the horizontal direction from the condition shown in FIG. 1, the ball 24 is moved on the guide surface 20, the pendulum 26 is pushed by the ball 24 and is swung, with the portion 0 of engagement between the projection 28 and the through hole 32 serving as the fulcrum, whereby the pendulum 26 is leaned in a manner such as that shown in FIG. 2.

The holding member 18 is provided with a pair of bearing portions 34 (see FIG. 3) which are adjacent to the cylindrical portion 22 and extend in such a manner as to face each other. A pawl 36, serving as a lever, has its one end pivotally supported by the bearing portions 34 via pin portions 38 projecting from the sides of the pawl 36. The pin portions 38 are disposed substantially parallel with the retractor shaft 10. The tip of the pawl 36 at the other end opposes the ratchet teeth of the lock ring 14.

The intermediate portion of the pawl 36 is provided with a projection-receiving portion 40 suspended therefrom. The projection-receiving portion 40 is umbrella-shaped and has its lower surface formed as an upwardly protruding conical surface. The tip of the projection 28 abuts against the conical surface formed by the lower surface of the projection-receiving portion 40, thereby preventing the pawl 36 from swinging in the direction C under its own weight. With the condition shown in FIG. 1 in which no acceleration as specified above is acting, the tip of the projection 28 abuts the center of the lower surface of the projection-receiving portion 40.

The lower surface of the projection-receiving portion 40 is set in the manner shown in FIG. 1 with respect to the locus D of the movement of the tip of the projection 28. By virtue of this arrangement, when the pendulum 26 is tilted, the projection-receiving portion 40 of the pawl 36 is pushed by the projection 28, whereby the pawl 36 is swung in the direction E to engage with one of the ratchet teeth of the lock ring 14.

Next, the operation of the acceleration sensor of the present invention will be described.

When neither a vertical acceleration nor a horizontal acceleration of a predetermined magnitude or greater acts, the acceleration sensor 16 is in the condition shown in FIG. 1. In this condition, since the tip of the pawl 36 is not in engagement with the ratchet teeth of the lock ring 14, the webbing 12 is in a state in which it can be reeled out.

When an acceleration of a predetermined magnitude or greater acts in the horizontal direction because of an emergency or the like experienced by the vehicle, the ball 24 is moved on the guide surface 20, and the pendulum 26 is pushed by the ball 24 to be swung about the fulcrum provided by the portion 0 of engagement between the projection 28 and the through hole 32, whereby the pendulum 26 is leaned. The projection 28 of the pendulum 26 pushes the projection-receiving portion 40 of the pawl 36, thereby causing the pawl 36 to swing in the direction E. By this action, the tip of the pawl 36 is brought into engagement with one of the ratchet teeth of the lock ring 14, thereby preventing the rotation of the lock ring 14 in the direction B and, hence, preventing the reeling out of the webbing 12.

When an acceleration of a large magnitude acts in the vertical direction because of the vibration or the like of the vehicle, the ball 24 is not moved on the guide surface 20, but it pushes the pendulum 26 upward. The pendulum 26, which is pushed by the ball 24, however, is not moved upward because the cap 30 acts to prevent such movement of the pendulum 26, nor is the pendulum 26 tilted with this condition thereof. In consequence, the pawl 36 remains unaffected by the acceleration and is kept from swinging. Therefore, preventing of the reeling out of the webbing 12 is not effected.

As described above, with the acceleration sensor of the present invention, when an acceleration of a large magnitude acts in the vertical direction, the lever of the sensor is prevented from being unnecessarily actuated.

What is claimed is:

1. An acceleration sensor comprising:
   a mass body which is held in a holding member and is movable relative to said holding member when an acceleration of a predetermined magnitude or greater acts on said holding member in a substantially horizontal direction;
   a transmission member which is tiltingly disposed upon said mass body in such a manner that an upward movement of said transmission member is prevented and which is tilted when urged by a movement of said mass body; and
   a lever which rests on said transmission member and which is swung when the tilting of said transmission member is transmitted thereto.

2. An acceleration sensor according to claim 1, wherein said mass body rests on a guide surface having a substantially conical configuration that protrudes downward.

3. An acceleration sensor accordingly to claim 1, wherein said transmission member comprises a first portion which rests upon said mass body and which has an upwardly convex spherical configuration, and a second portion which projects upward from a central portion of said first portion and which tapers upwards to a tip.

4. An acceleration sensor accordingly to claim 3, further comprising a movement limiting member for preventing an upward movement of said transmission member.

5. An acceleration sensor according to claim 4, wherein said second portion of said transmission member passes through said movement-limiting member, and a surface of said first portion of said transmission member that is close to said second portion abuts against said movement limiting member whereby an upward movement of said transmission member is prevented.

6. An acceleration sensor according to claim 5, wherein said lever has a receiving portion suspended therefrom, a lower surface of said receiving portion being formed as an upwardly protruding conical surface, the tip of said second portion of said transmission member contacting said conical surface of said receiving portion whereby said lever is swung by tilting of said second portion in contact with said receiving portion.

7. An acceleration sensor according to claim 6, wherein said lever is elongated and has one end thereof pivotally supported, said receiving portion being provided at an intermediate portion of said lever in a longitudinal direction thereof.

8. An acceleration sensor comprising:
a ball-shaped mass body;
a cylindrical member having an opening in the upper portion thereof and having a bottom wall on which said mass body is placed, said mass body being movable relative to said cylindrical member when an acceleration of a predetermined magnitude or greater acts on said cylindrical body in a substantially horizontal direction,
a transmission member which is disposed upon said mass body and which is tilted when urged by a movement of said mass body;
a movement-limiting member which abuts against an upper surface of said transmission member and allow the tilting of said transmission member and prevent the upward movement of said transmission member; and
a lever which is disposed upon said transmission member and which is swung when urged by the tilting of said transmission member.

9. An acceleration sensor according to claim 8, wherein said bottom wall of said cylindrical member has a substantially conical configuration that protrudes downward.

10. An acceleration sensor according to claim 8, wherein said transmission member comprises a first portion having a lower surface formed as an upwardly convex spherical surface a part of which is in contract with an upper surface of said mass body, and a second portion projecting upward from an upper surface of a central portion of said first portion.

11. An acceleration sensor according to claim 10, wherein said second portion of said transmission member passes through said movement limiting member from below, and the upper surface of said first portion of said transmission member abuts against said movement limiting member whereby an upward movement of said transmission member is prevented.

12. An acceleration sensor according to claim 11, wherein said prevention member comprises a cap secured to said cylindrical member in such a manner as to cover said opening of said cylindrical member.

13. An acceleration sensor according to claim 12, wherein said cap has its lower surface formed as a downwardly protruding conical surface.

14. An acceleration sensor according to claim 13, wherein said lever has a receiving portion suspended therefrom, the lower surface of said receiving portion being formed as an upwardly protruding conical surface, an end of said second portion of said transmission member abutting against said conical surface of said receiving portion whereby said lever is swung by movement of said second portion relative to said receiving portion.

15. An acceleration sensor having a ball which is held in a holding member and is movable relative to said holding member when an acceleration of a predetermined magnitude or greater acts on said holding member in a horizontal direction, and a pawl which is swung by a movement of the ball, comprising:
a transmission member which is tiltingly disposed upon an upper surface of said ball, said transmission member being tilted when urged by a movement of said ball, in such a manner as to allow rolling of said ball while said transmission member urges said pawl; and
a prevention member which abuts against an upper surface of said transmission member in such a manner as to allow the tilting of said transmission member and prevent an upward movement of said transmission member.

16. An acceleration sensor according to claim 15, wherein said holding member comprises a cylindrical member having an opening in an upper portion thereof and having a bottom wall on which said ball is placed.

17. An acceleration sensor according to claim 16, wherein said transmission member comprises a portion having its lower surface formed as an upwardly convex spherical surface a part of which is in contact with an upper surface of said ball, and a tapered projection projecting upward to a tip from an upper surface of a central region of the portion.

18. An acceleration sensor according to claim 17, wherein said projecting of said transmission member passes through said prevention member from below and a part of the upper surface of said portion of said transmission member that is in the vicinity of said projection abuts against said prevention member whereby an upward movement of said transmission member is prevented.

19. An acceleration sensor according to claim 18, wherein said prevention member comprises a cap secured to said cylindrical member in such a manner as to cover said opening of said cylindrical member.

20. An acceleration sensor accordingly to claim 19, wherein said pawl has a receiving portion suspended therefrom a lower surfaces of said receiving portion being formed as an upwardly projecting conical surface, the tip of said projection of said transmission member abutting against said conical surface of said receiving portion whereby said pawl is swung by movement of said projection relative to said receiving portion.

* * * * *